(12) United States Patent
Khanna et al.

(10) Patent No.: US 7,299,354 B2
(45) Date of Patent: Nov. 20, 2007

(54) METHOD TO AUTHENTICATE CLIENTS AND HOSTS TO PROVIDE SECURE NETWORK BOOT

(75) Inventors: Rahul Khanna, Beaverton, OR (US); Vincent J. Zimmer, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 698 days.

(21) Appl. No.: 10/675,381

(22) Filed: Sep. 30, 2003

(65) Prior Publication Data

US 2005/0071677 A1    Mar. 31, 2005

(51) Int. Cl.
*H04L 9/00* (2006.01)

(52) U.S. Cl. .................. 713/165; 713/168; 713/176; 380/278; 380/44; 380/46

(58) Field of Classification Search ............... 713/165, 713/2, 168, 176; 726/4, 10, 14, 15, 22, 13, 726/2; 709/227; 710/315, 105; 380/278, 380/44, 46
See application file for complete search history.

(56) References Cited

U.S. PATENT DOCUMENTS

| | | | |
|---|---|---|---|
| 5,349,643 A * | 9/1994 | Cox et al. | 713/155 |
| 5,826,015 A | 10/1998 | Schmidt | |
| 5,978,912 A | 11/1999 | Rakavy et al. | |
| 6,105,013 A | 8/2000 | Curry et al. | |
| 6,189,100 B1 | 2/2001 | Barr et al. | |
| 6,199,194 B1 | 3/2001 | Wang et al. | |
| 6,684,326 B1 | 1/2004 | Cromer et al. | |
| 6,871,210 B1 * | 3/2005 | Subramanian | 709/203 |
| 6,976,163 B1 | 12/2005 | Hind et al. | |
| 7,085,385 B2 | 8/2006 | Frantz et al. | |
| 7,089,300 B1 * | 8/2006 | Birse et al. | 709/221 |
| 7,103,772 B2 | 9/2006 | Jørgensen et al. | |
| 2002/0120847 A1 | 8/2002 | Kamperman | |
| 2003/0226017 A1 | 12/2003 | Palekar et al. | |
| 2003/0226018 A1 | 12/2003 | Tardo et al. | |
| 2004/0010686 A1 | 1/2004 | Goh et al. | |
| 2004/0193867 A1 * | 9/2004 | Zimmer et al. | 713/2 |
| 2005/0010680 A1 * | 1/2005 | Zick et al. | 709/237 |
| 2005/0044363 A1 | 2/2005 | Zimmer et al. | |
| 2005/0081036 A1 | 4/2005 | Hsu | |
| 2005/0144448 A1 | 6/2005 | England et al. | |
| 2005/0278531 A1 | 12/2005 | England et al. | |
| 2006/0095769 A1 | 5/2006 | Zuccherato et al. | |

* cited by examiner

*Primary Examiner*—T. B. Truong
(74) *Attorney, Agent, or Firm*—Blakely, Sokoloff, Taylor & Zafman LLP

(57) ABSTRACT

A method for authenticating clients and boot server hosts to provide a secure network boot environment. Messages are exchanged between a client and a boot server or authentication server proxy for the boot server during pre-boot operations of the client to authentic the boot server and the client. In one embodiment, authentication is performed by comparing shared secrets stored on each of the client and the boot server or authentication proxy. The shared secret comprises authentication credentials that may be provisioned by an administrator, user, or by the client itself via a trusted platform module. Authentication provisioning schemes include an Extensible Authentication Protocol (EAP) exchange. In one embodiment, authentication is performed during the pre-boot via an authenticated Dynamic Host Configuration Protocol (DHCP) process. The scheme provides a faster and more simplified authentication mechanism, without requiring extensive set-up for IT administrators or significantly changing the login and OS boot user experience.

27 Claims, 5 Drawing Sheets

METHOD TO AUTHENTICATE CLIENTS AND HOSTS TO PROVIDE SECURE NETWORK BOOT

FIELD OF THE INVENTION

The field of invention relates generally to computer systems and, more specifically but not exclusively relates to an authentication technique to enable secure network booting.

BACKGROUND INFORMATION

It is becoming ever more common to provide network booting of operating systems (OS) in enterprise environments, web server environments, and the like. Under a network operating system boot, an OS image is loaded (booted) from a network resource, such as a boot server. This scheme provides advantages relating to configuration control and generally reduces IT management costs, while at the same time reducing licensing costs.

While advantageous in many ways, the conventional network-booting scheme is unsecure. For instance, an insider may advertise the availability of a rogue boot server masquerading as a legitimate boot server that serves malicious OS images. The net result is that unknowing users load a malicious OS image, which may contain a virus that causes widespread havoc or a Trojan that sits unnoticed for days, weeks, or months until an activation event occurs, causing the Trojan code to be launched.

In view of this problem, techniques have been developed to authenticate boot images (or boot servers hosting such boot images) such that malicious or otherwise unauthentic images can be easily identified, preventing such images from being booted. For example, BOOT Integrity Services, commonly called BIS, provide a mechanism to authenticate a boot image that is derived from a DHCP (Dynamic Host Controller Protocol) offer. Even through the mechanism is sufficient to ascertain that the image is not modified in any way (i.e., is authentic), it has some shortcomings that may prevent its use in more secure environments.

One problem is the conventional scheme uses digital certificates that need to be certified. The certificate generated by the server needs to be authenticated by CA (Certificate Authority) and CRL (Certificate Revocation List) if not Self-Signed. If one of these servers is down, a false certificate may accidentally be accepted. In the case of Self-Signed certificated, its origin cannot be verified. Even though there is a provision for public key cryptography, an established mechanism for authentication of the client and boot server is still lacking. This may cause a malicious DHCP Server to act as a "Man in the Middle" or a "Malicious Proxy DHCP Server".

Public Key cryptography can be very taxing because of exponent mathematics. This is more so in low power clients, such as PDA (Personal Digital Assistant) or wireless clients. For example, on a 16 MHz client, a 512-bit modular multiplication costs about 100 ms per calculation. As a result, decrypting a downloaded boot image via public key encryption may take seconds or even minutes, depending upon the type of client performing the download.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION OF PREFERRED EMBODIMENTS

Embodiments of methods and system for supporting a secure network boot using a simplified authentication mechanism are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Embodiments of the present invention provide a secure network boot flow that implements an authentication scheme that does not require the client to use public key encryption methods with each boot. Rather, shared secret data one the client and boot server (or authentication proxy) are compared during pre-boot using a secure message exchange process. This provides a faster and more simplified authentication mechanism, without requiring extensive set-up for IT administrators or significantly changing the login and OS boot user experience.

Figure 1:
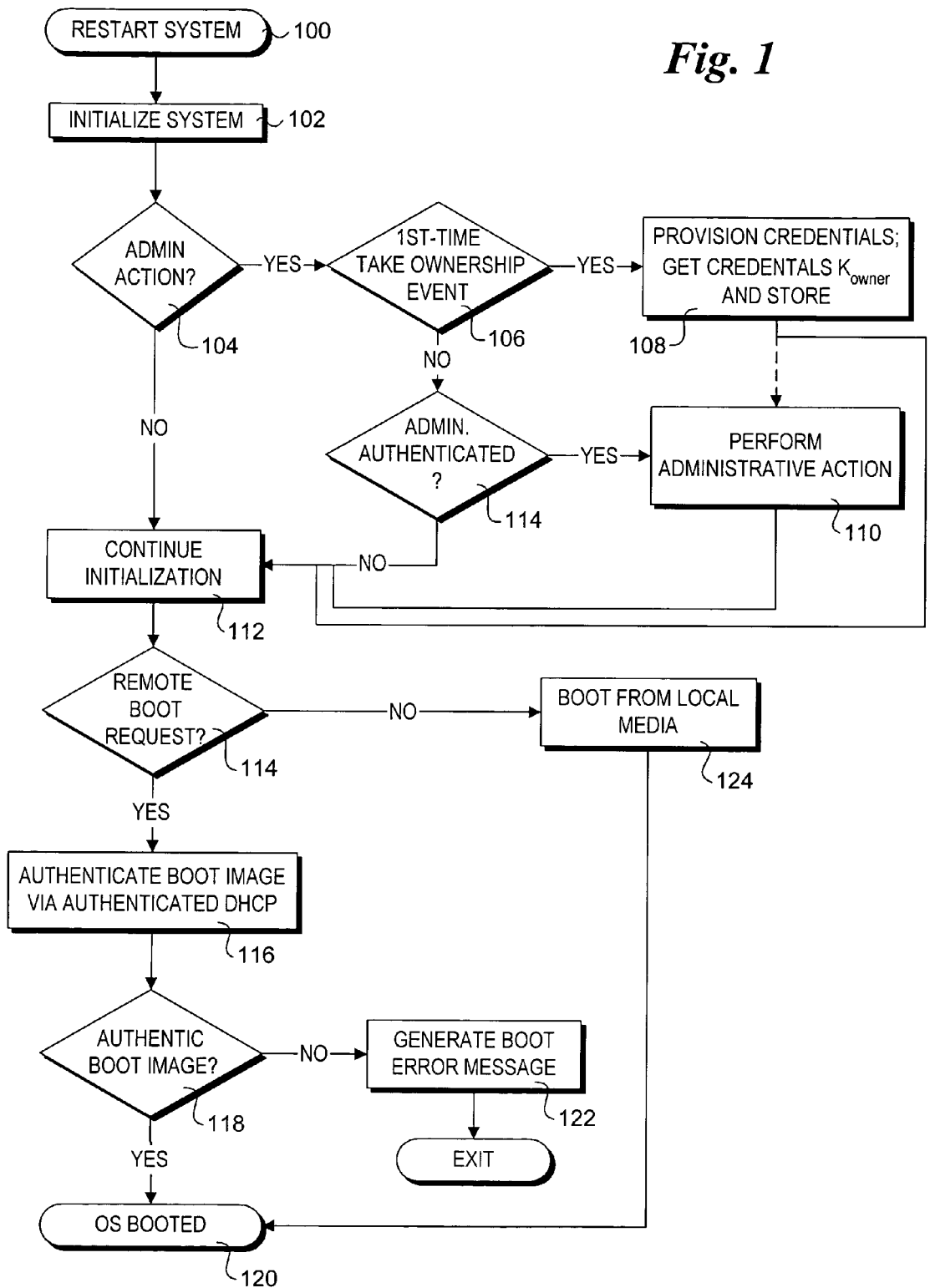
FIG. 1 is a flowchart illustrating operations and logic implemented to perform a secure network boot process, according to one embodiment of the invention.

As an overview of one embodiment of the flow process, attention is directed to the flowchart of FIG. 1. The process starts off in a start block 100, which depicts a restart event, i.e., an event corresponding to a restart or reset of a computer system. In response to the restart event, system initialization begins in a block 102A. During system initialization, system firmware is loaded and executed to verify operation of various system components (e.g., POST (power-on self test) operations), set up run-time firmware services, and to prepare the system for subsequent loading of an operating system.

During the system initialization, a determination is made in a decision block 104 to whether an administrative action is requested. For example, for a newly-deployed system, an administrator may wish to perform some initial security measures, such as setting up a userID (i.e., Login) and password. Typically, the administrative action may be made available via a console input, function key activation, or selection of an administrative action option presented to a user during system initialization.

If the answer to decision block 104 is YES, the logic proceeds to a decision block 106 in which a determination is made to whether this is a first time "take ownership" event. In brief, a take ownership event concerns setting up access to a system via some sort of authentication scheme involving "ownership" or authentication credentials. Ownership may apply to complete access to a system, or may be restricted to a particular aspect of the system, such as a boot server could "own" control of a system's operating system. In accordance with principles of the current embodiment, the determination in decision block 106 relates to establishing a one-time shared secret between a client system and a boot server.

Thus, if the answer to decision block 106 is YES, the logic proceeds to a block 108 in which authentication credentials are provisioned. In one embodiment, this comprises a shared secret that is issued in the form of a shared key ($K_{owner}$) and stored on either the client (if selected from a key list already stored on the boot server or an authentication server or proxy server of either), or stored on both the client and the boot server (if dynamically generated by the boot server, authentication server, or proxy). There are several schemes for provisioning authentication credentials that are well-known in the security arts that may be used.

For example, in one embodiment, a credential-provisioning scheme is implemented via an in-system Baseboard Management Controller (BMC) service processor and associated local or remote intelligent platform management interface (IPMI)—(http://www.intel.com/design/servers/ipmi/spec.htm) messaging that is used to load a shared secret password. Also, a system can support various "Take Ownership" or "Get Acquainted" protocols; these get acquainted protocols involve the user taking ownership of the platform. A means by which this credential provisioning can be handled can be an out-of-band channel (IPMI), a local console (i.e., setup screen where user types in initial password), or imprinting the system in a staging area (i.e., private network using Web Page served from the client and system administrator typing in initial password).

An alternate provisioning, "take owner-ship", or "get acquainted" protocol involves the use of public and private keys. With the advent of trusted platform modules (TPM), such as the TPM described in the Trusted Computing Group (http://www.trustedcomputinggroup.org), there is a set of key-pairs that are stored in a platform. To instantiate the shared key between the client and server, the client can use an Anonymous Identification Key (AIK) for which some local service vets. Then there can be a challenge/response sequence wherein the server authenticates the client using this key only during the "get acquainted" phase and the public key is used to encrypt a random number or string that shall become the shared secret. In this case, there is a secure means by which to establish the shared secret. There are also network protocols, such as the Extensible Authentication Protocol (EAP, RFC 2284), that facilitate this exchange in a simple, efficient manner. One advantage of EAP is that the protocol, in tandem with 802.1x switches, allows this exchange to occur prior to subsequent authenticated DHCP exchanges (i.e., you can do it prior to ascertaining your IP address). This does not require a full public key infrastructure (PKI) implementation, either. It can be a locally-administered infrastructure. Details of an exemplary EAP process for obtaining credentials are described below with reference to FIG. 3.

Returning to the flowchart of FIG. 1, once the credentials are provisioned, the logic proceeds to either a block 110 in which additional administrative actions may be performed, or proceeds directly to continuing system initialization in a block 112. In the event the one-time take ownership event has already been performed, in one embodiment a determination is made in a decision block 114 whether the administrator is authenticated. For example, there may be implementations under which an authentication challenge in the form of a key exchange is issued prior to allowing administrative access to a system. If the challenge is successful, the logic proceeds to block 110 in which the administrative action is performed. If the challenge is unsuccessful, the administrative action is not allowed, causing the logic to proceed to block 112 to continue the system initialization.

During a latter portion of the initialization sequence (generally), a determination is made in a decision block 114 to whether the system is to be booted from a network (i.e., a remote boot) or from local media. In general, a boot sequence can be defined for a Microsoft Windows® operating system by editing the boot.ini file. Similar techniques may be used for other operation systems, such as UNIX variants, LINUX variants, etc. In effect, the boot sequence will try to boot from one or more boot targets listed in the sequence in the order in which the boot targets are listed, e.g., CD-ROM, local disk, network boot, etc. If a remote boot request is made, the logic proceeds to a block 116 in which the boot image is authenticated using an authenticated DHCP process, as described below. The operating system is then booted in a block 120 if it is determined the boot image is authentic in a decision block 118, otherwise an error message is generated in a block 122. If a local boot image is available (and is encountered as a boot option prior to a network boot option), the OS is booted from the local media, as depicted in a block 120.

Figure 2:
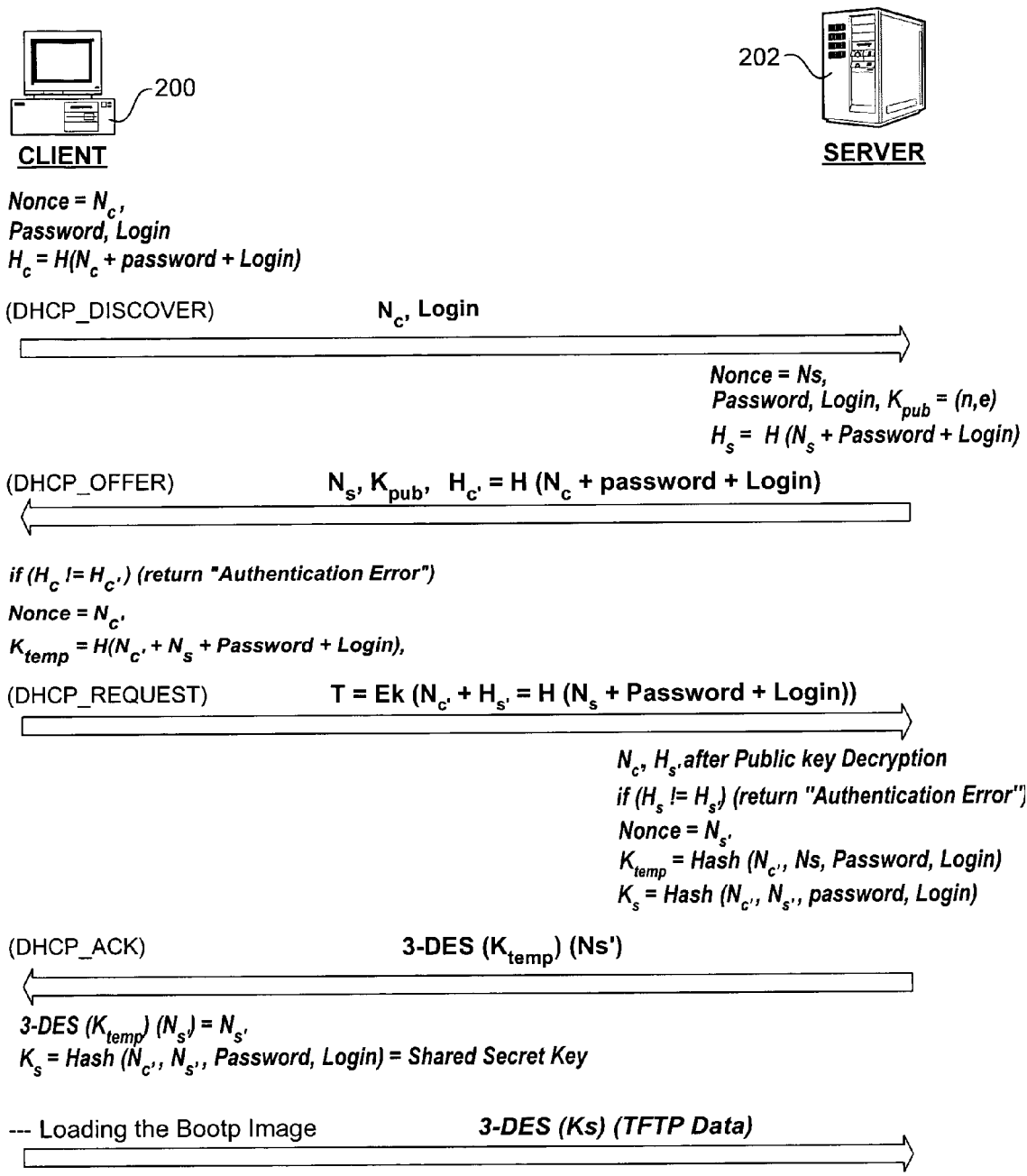
FIG. 2 is message flow diagram illustrating the exchange of messages and generation of message content in support of a DHCP (Dynamic Host Configuration Protocol) authentication scheme, according to one embodiment of the invention.

Further details of the operations of the boot image authentication process of block 116 in accordance with one embodiment are shown in FIG. 2. The process employs an implementation of authentication for DHCP messages, as defined in RFC (request for comment) 3118. DHCP transports protocol stack configuration parameters from centrally administered servers to TCP/IP hosts. Among those parameters is an IP (Internet Protocol) address. DHCP servers can be configured to dynamically allocate addresses from a pool of addresses, eliminating a manual step in configuration of TCP/IP hosts.

DHCP threats are similar to those for OS boot services discussed above. A typical threat to DHCP is inherently an insider threat (assuming a properly configured network where BOOTP ports are blocked on the enterprise's perimeter gateways.) Regardless of the gateway configuration, however, the potential attacks by insiders and outsiders are the same.

The attack specific to a DHCP client is the possibility of the establishment of a "rogue" server with the intent of providing incorrect configuration information to the client.

The motivation for doing so may be to establish a "man in the middle" attack or it may be for a "denial of service" (DoS) attack. There is another threat to DHCP clients from mistakenly or accidentally configured DHCP servers that answer DHCP client requests with unintentionally incorrect configuration parameters.

The threat specific to a DHCP server is an invalid client masquerading as a valid client. The motivation for this may be for "theft of service", or to circumvent auditing for any number of nefarious purposes. The threat common to both the client and the server is the resource DoS attack. These attacks typically involve the exhaustion of valid addresses, or the exhaustion of CPU or network bandwidth, and are present anytime there is a shared resource. In current practice, redundancy mitigates DoS attacks the best.

Returning to the event flow and message exchange diagram of FIG. 2, the authentication process starts at a client 200, which generates a nonce $N_c$ (as used herein, a subscript c represents a client-generated object, while a subscript s represents a boot server-generated object) and receives a Password and Login data in response to corresponding user entries. A nonce is a randomly generated value used to defeat "playback" attacks in communication Protocols. One party randomly generates a nonce and sends it to the other party. The receiver encrypts it using the agreed upon secret key and returns it to the sender. Since the nonce was randomly generated by the sender, this defeats playback attacks because the replayer cannot know in advance the nonce the sender will generate. The receiver denies connections that do not have the correctly encrypted nonce.

A hash $H_c$ is then derived by performing an SHA1 (secure hashing algorithm hash) on nonce $N_c$+password+Login). The client 200 then sends a DHCP_DISCOVER message containing Nonce $N_c$ and the Login data to a DHCP server 202. In one embodiment, DHCP server 202 is co-located with an OS boot server. In another embodiment, the DHCP server and the OS boot server are separate systems that share authentication credential data. An authentication server of DHCP proxy may be used as well.

Upon receiving the DHCP_DISCOVER message, DHCP server 202 generates a nonce $N_s$ and examines the Password and Login data. DHCP server 202 also generates a public key $K_{pub}$ (using a base/modulus (n) and exponent (e) for an RSA key) and a hash $H_{c'}$, which is a hash on the nonce $N_c$+Password+Login. The nonce $N_s$, key $K_{pub}$, and hash $H_{c'}$, are then returned to client 200 via a DHCP_OFFER message.

Upon receipt of the DHCP_OFFER message, client 200 compares hashes $H_c$ and $H_{c'}$. If they do not match, an "Authentication Error" is returned to server 202. If they do match, client 200 generates a nonce $N_{c'}$ and a temporary key $K_{temp}$, which is derived from a hash of nonce $N_c$+nonce $N_s$+Password+Login. Client 200 then sends an encrypted shared secret T, which is derived from an ephemeral key (Ek is the encryption operation used to generate the ephemeral key) of nonce $N_{c'}$ and a hash $H_{s'}$ of nonce $N_s$+Password+ Login in a DHCP_REQUEST message.

In response, server 202 extracts the nonce $N_{c'}$ and Hash on $N_c$+Password+Login. If the hash $H_s$ matches hash $H_{s'}$, the client request is honored; otherwise an "Authentication Error" is returned to the client 200. Server 202 then generates another nonce $N_{s'}$ and independently computes $K_{temp}$ via a hash on nonce $N_{c'}$, nonce $N_s$, Password and Login. It then sends nonce $N_{s'}$ using secret key cryptography (e.g., data encryption standard 3-DES) with the key derived from $K_{temp}$ and sends the encrypted data to client 200 in a DHCP_ACK (DHCP acknowledge) message. The new key to be used for any future sessions (the session key) is $K_s$=Hash ($N_{c'}$, $N_{s'}$, Password, Login).

The client 200 derives the nonce $N_{s'}$ using the pre-calculated $K_{temp}$ using 3-DES decryption, and calculates the session key $K_s$=Hash ($N_{c'}$, $N_{s'}$, Password, Login). The client 200 can then use TFTP (Trivial File Transfer Protocol) to download the OS boot Image and extract it using the newly calculated session key $K_s$. In one embodiment, the IPSec Authentication Header is used to prefix the encrypted TFTP data payloads.

As discussed above, at some point in time prior to performing a secure network boot, it will be necessary to provide a shared secret to both the client that boots the authenticated boot image and the server from which the image is served. In one embodiment, the Extensible Authentication Protocol is employed as the means for communicating authentication information between a Supplicant (EAP peer) and an Authenticator (EAP server). EAP is a general protocol that supports multiple authentication mechanisms. For example, through the use of EAP, support for a number of authentication schemes may be added, including smart cards, Kerberos, Public Key Encryption, One Time Passwords, and others.

Figure 3:
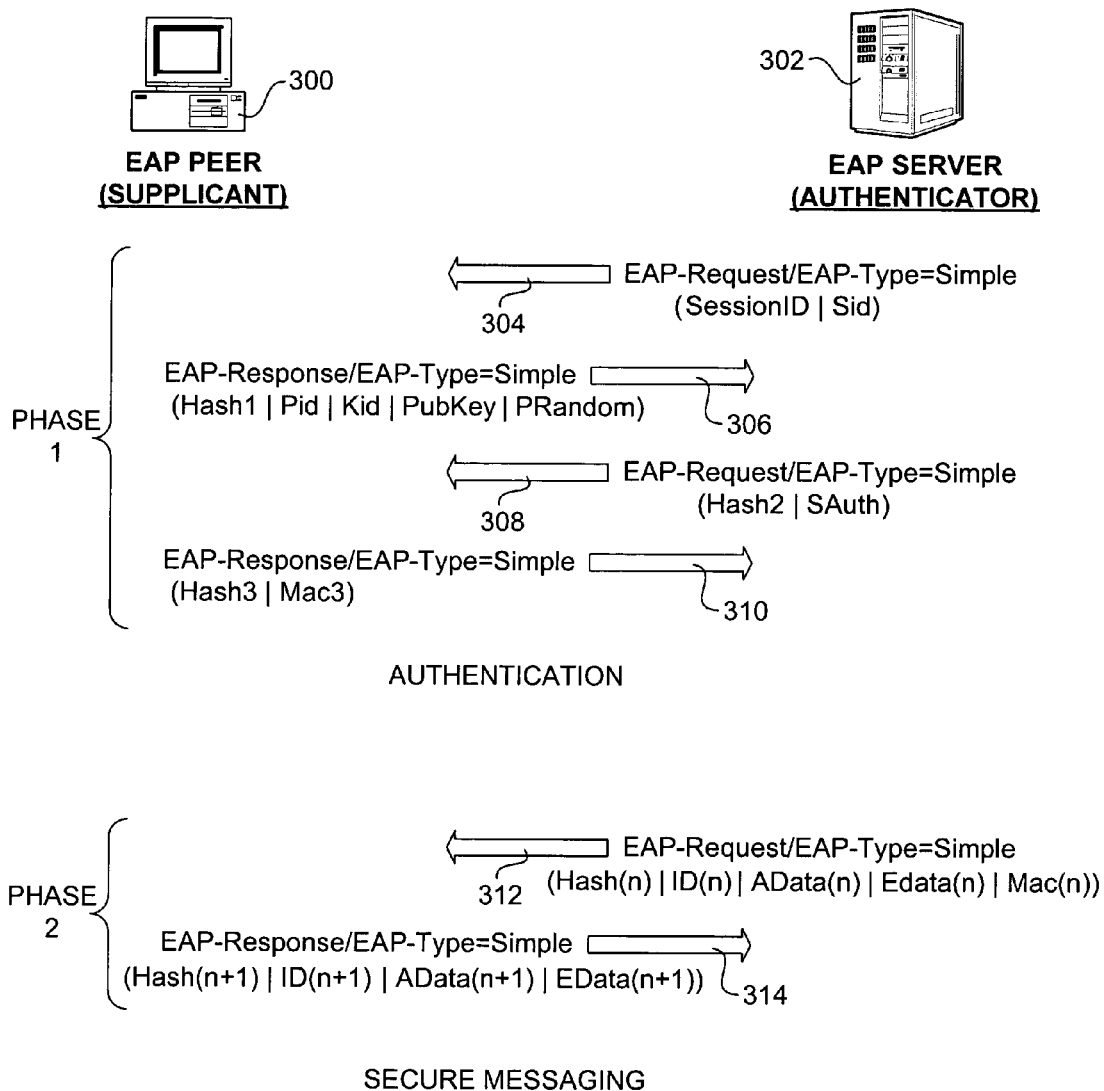
FIG. 3 is a message flow diagram illustrating the exchange of messages and generation of message content under an Extensible Authentication Protocol (EAP) scheme that is used to provision shared credentials on a client (supplicant) and a server (authenticator), according to one embodiment of the invention

An exemplary EAP-based shared secret (i.e., key) exchange is shown in FIG. 3. The process involves two phases, including a phase 1 under which authentication is performed, and a phase 2 during which secure messages are exchanged. The process begins at an EAP server (Authenticator) 302, which sends an EAP request message 304 containing a SessionID and a Sid to an EAP Peer (Supplicant) 300. In one embodiment, the SessionID is a 256-bit random value generated by the authenticator. The Sid comprises and EAP server identity. In one embodiment, the Sid comprises a network access identifier as specified by RFC 2486.

In response to receiving EAP request message 304, EAP peer 300 returns an EAP response message 306 including a concatenation of a first hash Hash1, a Pid value, a Kid value, a public key (PubKey) and a random number Prandom selected by the EAP peer. Hash1 is an SHA1 hash of the first message (i.e., EAP request message 304). Pid identifies the EAP Peer 300, and hence, the owner or device key. In one embodiment, Pid comprises a GUID (globally unique identifier). Kid identifies the symmetric key the EAP peer expects to use in this context. PubKey is EAP peer 300's public key portion of the device key.

The EAP server 302 then sends an EAP request message 308 containing a second hash Hash2 comprising a hash on EAP response message 306, and an SAuth value, which comprises a concatenation of 3 items, encrypted under EAP peer 300's public device key: (1) session key $K_s$, (2) value of Hash2 repeated, and (3) an HMAC-SHA1-96 digest on the concatenation of $K_s$ | Hash2. In response, EAP peer 300 returns an EAP response 310 containing a third hash Hash3 comprising a hash on EAP request message 308, and a Mac3 value, comprising an HMAC-SHA1-96 digest of Hash3 under the KCK portion of $K_s$. This completes the phase 1 authentication process.

In one embodiment, $K_s$ comprises a 60-octet (480-bit) key with an internal structure of three 20-octete (160-bit) sub-keys, including:

(1) KCK—1$^{st}$ octet of $K_s$. Key confirmation key.
(2) KDK—2$^{nd}$ octet of $K_s$. Key derivation key.
(3) KEK—3$^{rd}$ octet of $K_s$. Key encryption key.

During phase 2, the secure messaging phase, messages are exchanged in a secure manner under which an encrypted format is used that references the previous message received at each participant. This is depicted by the "n" and "n+1" nomenclature shown in FIG. 3. Each message includes a concatenation of a hash on the previous message (e.g., Hash(n)), a one-byte ID value identifying the type of data being conveyed, Adata, identifying data that is authenticated, Edata, identifying encrypted data, and an Mac value, comprising an HMAC-SHA1-96 digest of the other fields in the message, using the KCK portion of the session key $K_s$. In one embodiment, the encrypted Edata only includes keys and keying material. During the phase 2 operations, a shared secret, such as a key, may be securely exchanged between the EAP peer 300 and EAP server 302.

Figure 4:
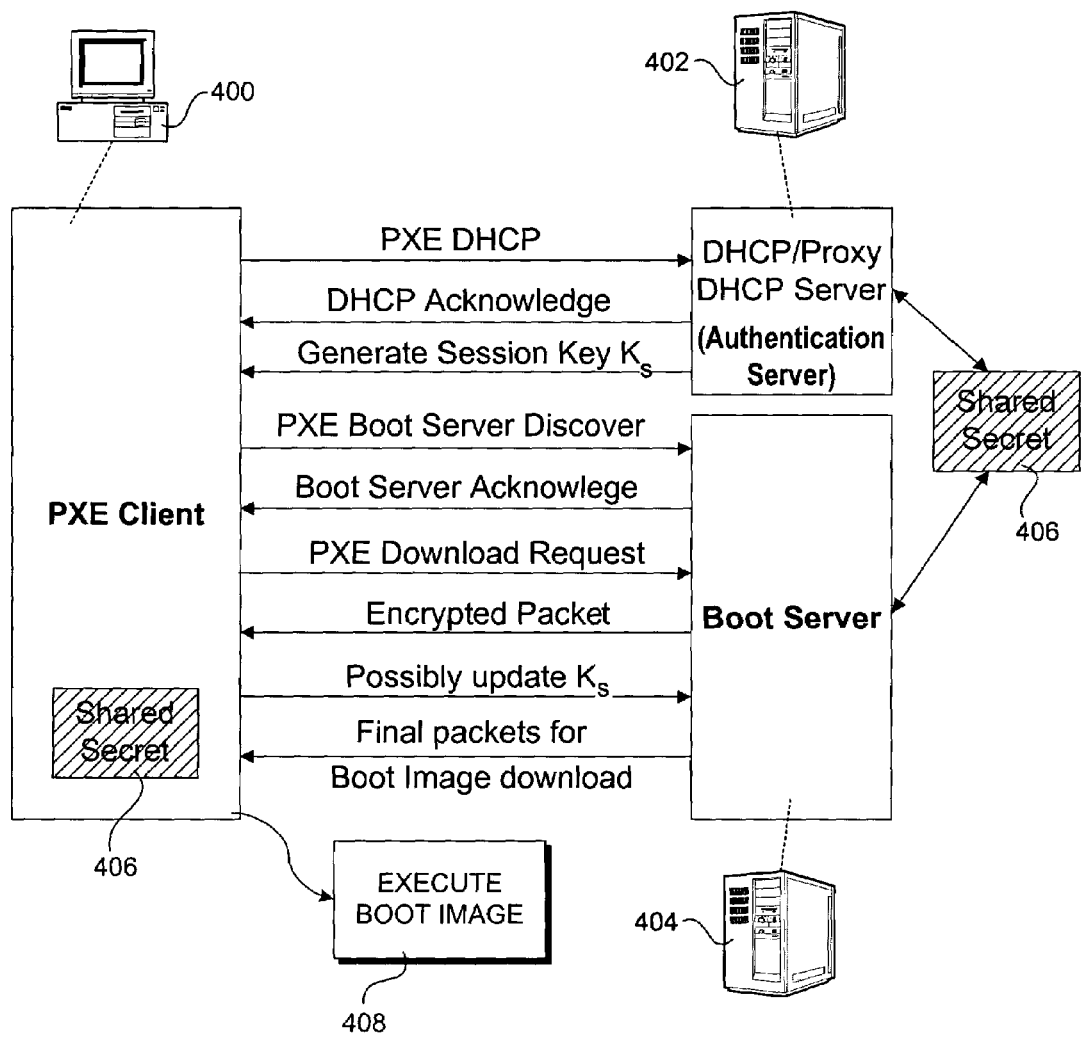
FIG. 4 is a schematic diagram illustrating the exchange of messages between a PXE (pre-boot execution environment) client, DHCP server, and boot server during a secure network boot process, according to one embodiment of the invention

FIG. 4 shows a set of message exchanges comprising an encapsulation of the authentication and secure boot image process involving a PXE (pre-boot execution environment) client 400, a DHCP (or a DHCP/Proxy) server 402, and a boot server 404. In addition to being hosted by separate machines (as shown), DHCP server 402 and boot server 404 may be co-located. DHCP server 402 is also representative of an authentication server, in general.

PXE is defined on a foundation of industry-standard Internet protocols and services that are widely deployed in the industry, namely TCP/IP, DHCP, and TFTP. These standardize the form of the interactions between clients and servers. To ensure that the meaning of the client-server interaction is standardized as well, certain vendor option fields in the DHCP protocol are used, which are allowed by the DHCP standard. The operations of standard DHCP and/or BOOTP servers (that serve up IP addresses and/or network bootstrap programs) will not be disrupted by the use of the extended protocol. Clients and servers that are aware of these extensions will recognize and use this information, and those that do not recognize the extensions will ignore them.

PXE client 400 and DHCP server 402 perform the authentication process of FIG. 2, confirming shared secret 406, as depicted by PXE DHCP and DHCP acknowledge messages, using the PXE protocol. In brief, the PXE protocol operates as follows. The client initiates the protocol by broadcasting a DHCP_DISCOVER containing an extension that identifies the request as coming from a client that implements the PXE protocol. Assuming that a DHCP server or a Proxy DHCP server implementing this extended protocol is available, after several intermediate steps, the server sends the client a list of appropriate boot servers. The client then discovers a boot server of the type selected and receives the name of an executable file on the chosen boot server. The client uses TFTP to download the executable from the boot server. Finally, the client initiates execution of the downloaded image.

During this authentication process, a session key $K_s$ is also generated. PXE client 400 then sends a PXE boot server discover message to boot server 404. In short, the PXE boot server discover message is a message that is sent to listening devices on a network that is used in discovering the existence of any PXE boot servers on the network. In response to the discover message, the boot server returns an acknowledgement, and PXE client 400 sends a PXE download request. Packets encrypted using the session key Ks and corresponding to a target boot image are then served by boot server 404 to PXE client 400. As an option, session key Ks may be updated during this process. Subsequently, a final set of encrypted packets are received by PXE client 400. Once downloaded, the secure boot image is loaded and executed, as depicted by a block 406.

The foregoing authentication and secure boot technique provides several advantageous over current network boot processes. These include:

1. It is faster because the client doesn't use any public key encryption methods after the initial shared secret exchange. In some embodiments, there is one time public key encryption using the server's public key. Even in this case, if the server's public exponent is small (i.e., 3 or less), there are going to be at minimum of 2 multiplications without loss of any security. The rest of the computation is mostly hash calculations or secret key cryptography like 3-DES. The average time taken by these algorithms for 512 bit modular computations on 16 MHz machine is 4-5 ms. Therefore a very large boot file can be downloaded securely and faster.

2. The end of the authenticated DHCP process completes security negotiations. After that, most of the communication is based upon Secret Key Cryptography using the independently computed key.

3. Both Client & Server are able to authenticate each other by the end of the authenticated DHCP process, while establishing a secret key for future communication.

4. Prevents a "Man in the Middle" attack using a malicious DHCP server.

5. No digital certificates or $3^{rd}$ parties are required to authenticate the identity of each other.

6. Uses the default password and login that may have been provided by the network administrator or ISP. In some embodiments, this is used as a shared key between them.

7. The technique provides a simple means to provision credentials. The "getting to know" or "take ownership" phase is often omitted. This one-time or rare-event can be based upon more time-consuming public key cryptographic operations.

Exemplary Computer System for Practicing Embodiments of the Invention

Figure 5:
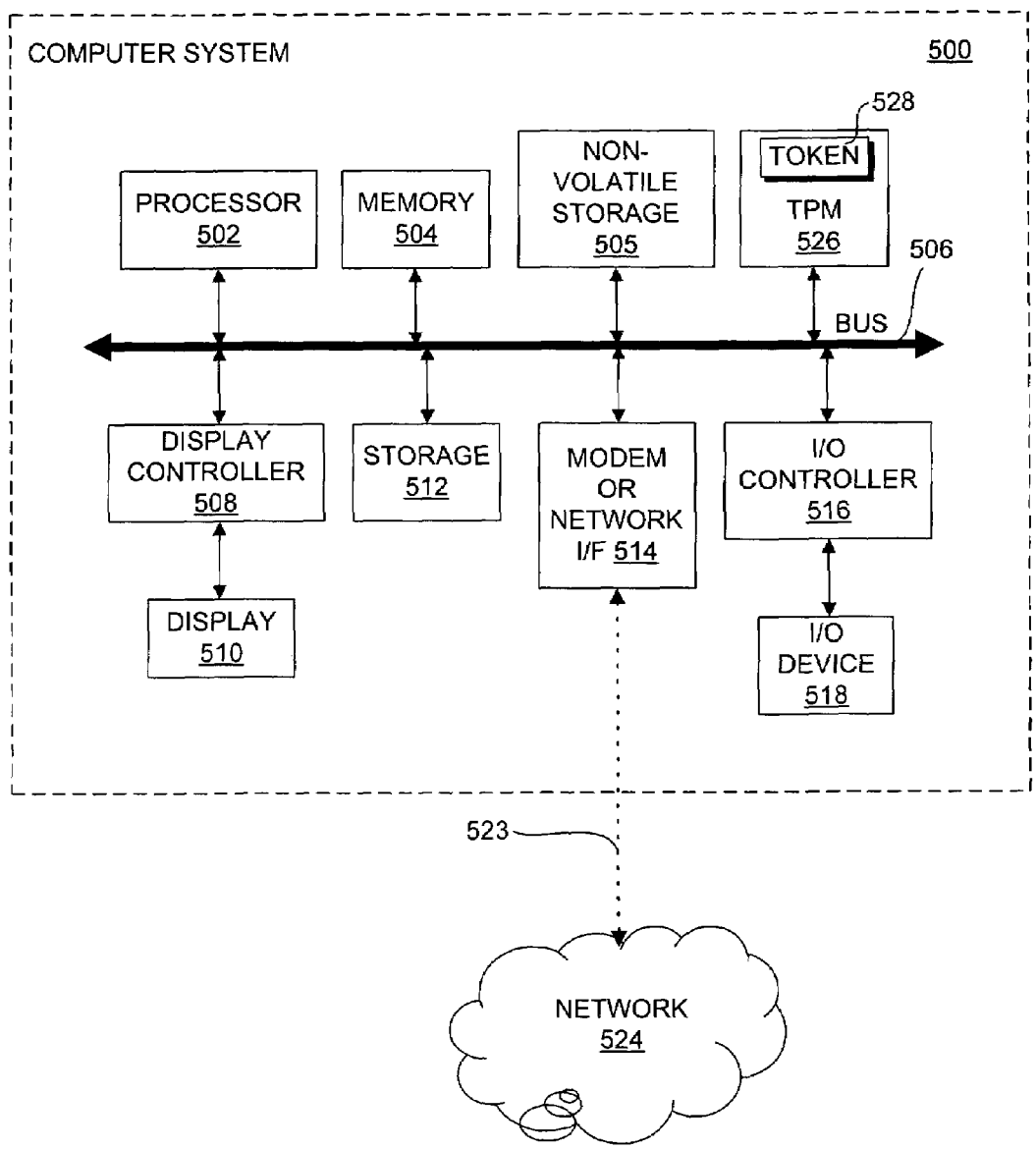
FIG. 5 is a schematic block diagram illustrating a configuration of an exemplary computer system that may be used to practice embodiments of the invention.

FIG. 5 is an illustration of one embodiment of an exemplary computer system 500 on which embodiments of the present invention may be implemented. Computer system 500 includes a processor 502 coupled to a bus 506. Memory 504, storage 512, non-volatile storage 505, display controller 508, input/output controller 516 and modem or network interface 514 are also coupled to bus 506. The computer system 500 interfaces to external systems through the modem or network interface 514. This interface 514 may began analog modem, Integrated Services Digital Network (ISDN) modem, cable modem, Digital Subscriber Line (DSL) modem, a T-1 line interface, a T-3 line interface, token ring interface, satellite transmission interface, or other interfaces for coupling a computer system to other computer systems. A carrier wave signal 523 is received/transmitted by modem or network interface 514 to communicate with computer system 500. In the embodiment illustrated in FIG. 5, carrier waive signal 523 is used to interface computer system 500 with a computer network 524, such as a local area network (LAN), wide area network (WAN), or the Internet. In one embodiment, computer network 524 is further coupled to a remote computer (not shown), such that computer system 500 and the remote computer can communicate.

Processor 502 may be a conventional microprocessor including, but not limited to, an Intel Corporation x86, Pentium, or Itanium family microprocessor, a Motorola family microprocessor, or the like. Memory 504 may include, but not limited to, Dynamic Random Access Memory (DRAM), Static Random Access Memory (SRAM), Synchronized Dynamic Random Access Memory (SDRAM), Rambus Dynamic Random Access Memory (RDRAM), or the like. Display controller 508 controls in a conventional manner a display 510, which in one embodiment may be a cathode ray tube (CRT), a liquid crystal display (LCD), and active matrix display or the like. An input/output device 518 coupled to input/output controller 516 may be a keyboard, disk drive, printer, scanner and other input and output devices, including a mouse, trackball, trackpad, joystick, or other pointing device.

In general, non-volatile storage 505 is used to store instructions, such as firmware, and/or data. Non-volatile storage devices include, but are not limited to, Read-Only Memory (ROM), Flash memory, Erasable Programmable Read Only Memory (EPROM), Electronically Erasable Programmable Read Only Memory (EEPROM), or the like.

Storage 512 in one embodiment may be a magnetic hard disk, an optical disk, or another form of storage for large amounts of data. Some data may be written by a direct memory access process into memory 504 during execution of software in computer system 500. It is appreciated that software may reside in storage 512, memory 504, non-volatile storage 505 or may be transmitted or received via modem or network interface 514.

In embodiments in which the "take ownership" protocol is implemented via a trusted platform module, a TMP 526 may be provided. In general, TMP 526 may be used to generate a shared secret (i.e., key) using one of many mechanisms defined by corresponding specifications available at http:H/www.trustedcomptuinggroup.org. The shared secret is generally depicted as an ownership token 528.

For the purposes of the specification, a machine-readable medium includes any mechanism that provides (i.e., stores and/or transmits) information in a form readable or accessible by a machine (e.g., a computer, network device, personal digital assistant, manufacturing tool, any device with a set of one or more processors, etc.). For example, a machine-readable medium includes, but is not limited to, recordable/non-recordable media (e.g., a read only memory (ROM), a random access memory (RAM), a magnetic disk storage media, an optical storage media, a flash memory device, etc.).

It will be appreciated that computer system 500 is one example of many possible computer systems that have different architectures. For example, computer systems that utilize the Microsoft Windows operating system in combination with Intel microprocessors often have multiple buses, one of which may be considered a peripheral bus. Network computers may also be considered as computer systems that may be used with the present invention. Network computers may not include a hard disk or other mass storage, and the executable programs are loaded from a corded or wireless network connection into memory 504 for execution by processor 502. In addition, handheld or palmtop computers, which are sometimes generally referred to as personal digital assistants (PDAs) or pocket PCs, may also be considered as computer systems that may be used with the present invention. As with network computers, handheld computers may not include a hard disk or other mass storage, and the executable programs are loaded from a corded or wireless network connection into memory 504 for execution by processor 502. A typical computer system will usually include at least a processor 502, memory 504, and a bus 506 coupling memory 504 to processor 502.

It will also be appreciated that in one embodiment, computer system 500 is controlled by operating system software that includes a file management system, such as a disk operating system, which is part of the operating system software. For example, one embodiment of the present invention utilizes Microsoft Windows® as the operating system for computer system 500. In other embodiments, other operating systems that may also be used with computer system 500 include, but are not limited to, the Apple Macintosh® operating system, the Linux operating system, the Microsoft Windows CE® operating system, the Unix operating system, the 3Com Palm® operating system, or the like.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method, comprising:
   authenticating, during a pre-boot phase of a client, a boot server on which an operating system (OS) boot image is stored;
   downloading an OS boot image from the boot server if it is authenticated; and
   loading the OS boot image on the client, wherein a shared secret is stored at the client and at the boot server, wherein authenticating the boot server includes:
   generating a random value at the client;
   transmitting the random value to the boot server;
   receiving an encrypted value at the client, the encrypted value encrypted at the boot server using the random value and the shared secret stored by the boot server;
   decrypting the encrypted value at the client using the shared secret stored by the client; and
   comparing the random value with the encrypted value that is decrypted.

2. The method of claim 1, further comprising provisioning the shared secret to at least one of the client and the boot server during a one-time provisioning event such that both the client and the boot server have access to the shared secret.

3. The method of claim 2, wherein the shared secret is provisioned using an Extensible Authentication Protocol (EAP message) exchange between an authenticator EAP server and the client.

4. The method of claim 2, wherein the shared secret is provisioned from the client to the server and is formulated via a key that is generated by a trusted platform module stored by the client.

5. The method of claim 2, wherein the shared secret is provisioned using a take ownership protocol under which one of a user or administrator takes ownership of a computer system by providing authentication credentials for that system.

6. The method of claim 5, wherein the take ownership protocol comprises provisioning authentication credentials via one of the following: provisioning authentication credentials on the client via an out-of-band channel, enabling a user to enter authentication credentials via a local console, and imprinting the client with authentication credentials via remote entry of the authentication credentials by a system administrator.

7. The method of claim 1, wherein the boot server is authenticated using an authenticated dynamic host configuration protocol (DHCP) message exchange process.

8. The method of claim 1, further comprising authenticating the client prior to allowing a client to download an OS boot image.

9. The method of claim 8, wherein the client is authenticated using an authenticated dynamic host configuration protocol (DHCP) message exchange process.

10. The method of claim 8, wherein the client is authenticated by performing the operations of:
   encrypting the shared secret stored at the client;
   passing the encrypted shared secret to one of the boot server and an authentication proxy for the boot server;
   decrypting the encrypted shared secret at said one of the boot server and the proxy for the boot server; and
   comparing a shared secret stored at said one of the boot server and the authentication proxy for the boot server with the encrypted shared secret that is decrypted.

11. The method of claim 1, further comprising:
   generating a session key; and
   employing the session key for encryption and decryption of data transferred between the boot server and the client.

12. The method of claim 11, further comprising:
   updating the session key at some point during download of the OS boot image; and
   employing the updated session key for encryption and decryption of data transferred between the boot server and the client while downloading a subsequent portion of the OS boot image.

13. The method of claim 1, wherein the shared secret is derived from the combination of a user login and a password corresponding to the user login.

14. A computer system, comprising:
   a processor;
   memory, coupled to the processor;
   a network interface, coupled to the processor;
   a firmware storage device, coupled to the processor; having firmware instructions stored therein that when executed on the processor cause operations to be performed, including:
      interacting with a boot server via messages sent to and received from the boot server through the network interface during a pre-boot initialization phase of the computer system to authenticate the boot server;
      downloading an OS boot image from the boot server if it is authenticated; and
      loading the OS boot image into the memory, wherein a shared secret is stored at the computer system and at the boot server, wherein the boot server is authenticated by execution of the firmware instructions to further perform operations including:
   generating a random value at the computer system;
   transmitting the random value to the boot server;
   receiving an encrypted value at the computer system, the encrypted value encrypted at the boot server using the random value and the shared secret stored by the boot server;
   decrypting the encrypted value at the computer system using the shared secret stored by the computer system; and
   comparing the random value with the encrypted value that is decrypted.

15. The system of claim 14, wherein the boot server is authenticated using an authenticated dynamic host configuration protocol (DHCP) message exchange process.

16. The system of claim 15, wherein execution of the firmware instructions further performs authentication of the computer system via the authenticated DHCP message exchange process.

17. The system of claim 14, wherein the OS boot image is served from the boot server in an encrypted form, and execution of the firmware instructions further performs the operation of decrypting the OS boot image.

18. The system of claim 17, wherein execution of the firmware instructions further performs the operation of interacting, via a message exchange, with the boot server to agree on a session key that is used to encrypt and decrypt the OS boot image.

19. The system of claim 14, further comprising a trusted platform module, operatively coupled to the processor and storing an ownership token that is used to formulate the shared secret.

20. The system of claim 19, wherein the ownership token comprises a key that is instantiated via the trusted platform module.

21. A machine-readable media providing instructions to perform operations on a computer system, including:
   interacting with one of a boot server or authentication server via messages generated by the computer system and sent to the boot server or authentication server and messages received from the boot server or authentication server and processed by the computer system during a pre-boot initialization phase of the computer system to authenticate the boot server;
   sending a request to the boot server to download an OS boot image from the boot server if it is authenticated;
   downloading the OS boot image from the boot server; and
   loading the OS boot image into memory of the computer system, wherein a shared secret is stored at the computer system and at the boot server, wherein the boot server is authenticated by execution of the firmware instructions to further perform operations including:
   generating a random value at the computer system;
   transmitting the random value to the boot server;
   receiving an encrypted value at the computer system, the encrypted value encrypted at the boot server using the random value and the shared secret stored by the boot server;
   decrypting the encrypted value at the computer system using the shared secret stored by the computer system; and
   comparing the random value with the encrypted value that is decrypted.

22. The machine-readable media of claim 21, wherein the media comprises a firmware storage device and the instructions comprise firmware instructions.

23. The machine-readable media of claim 21, wherein execution of the instructions performs the further operation of broadcasting a boot server discovery message to locate the boot server.

24. The machine-readable media of claim 21, wherein execution of the instructions performs the further operations of:
   encrypting the shared secret stored at the computer system; and sending the shared secret in encrypted form to one of the boot server or an authentication proxy for the boot server.

25. The machine-readable media of claim 21, wherein the boot server is authenticated using an authenticated dynamic host configuration protocol (DHCP) message exchange process.

26. The machine-readable media of claim 25, wherein execution of the instructions further performs authentication of the computer system via the authenticated DHCP message exchange process.

27. The machine-readable media of claim 21, wherein execution of the instructions further performs the operations of:
  generating a user interface on the computer system via which a user can enter authentication credentials;
  generating the shared secret based on the authentication credentials; and
  sending the shared secret to the boot server or authentication server.

* * * * *